(12) United States Patent
Inoue

(10) Patent No.: US 7,090,256 B2
(45) Date of Patent: Aug. 15, 2006

(54) PIPE JOINT

(75) Inventor: Hiroshi Inoue, Kawachinagano (JP)

(73) Assignees: Inoue Sudare Co., Ltd., Kawachinagano (JP); Higashio Mech Co., Ltd., Kawachinagano (JP)

( * ) Notice: Subject to any disclaimer, the term of this patent is extended or adjusted under 35 U.S.C. 154(b) by 160 days.

(21) Appl. No.: 10/952,931

(22) Filed: Sep. 30, 2004

(65) Prior Publication Data

US 2005/0073148 A1    Apr. 7, 2005

(30) Foreign Application Priority Data

Oct. 3, 2003  (JP) .............................. 2003-346065

(51) Int. Cl.
*F16L 35/00* (2006.01)
*F16L 17/00* (2006.01)

(52) U.S. Cl. .................... 285/40; 285/330; 285/341

(58) Field of Classification Search ................ 285/330, 285/40, 339, 340, 341, 342, 343, 382.7
See application file for complete search history.

(56) References Cited

U.S. PATENT DOCUMENTS

| | | | | |
|---|---|---|---|---|
| 1,518,778 A | * | 12/1924 | Eastman | 285/238 |
| 2,139,413 A | * | 12/1938 | Kreidel | 285/341 |
| 2,406,478 A | * | 8/1946 | Snyder | 285/115 |
| 2,452,275 A | * | 10/1948 | Woodling | 285/341 |
| 2,497,273 A | * | 2/1950 | Richardson | 285/334.5 |
| 3,139,293 A | * | 6/1964 | Franck | 285/4 |
| 3,219,367 A | * | 11/1965 | Franck | 285/238 |
| 3,273,919 A | * | 9/1966 | Billeter et al. | 285/340 |
| 3,471,181 A | * | 10/1969 | Fuentes | 285/341 |
| 3,606,396 A | * | 9/1971 | Prosdocimo | 285/148.18 |
| 3,633,944 A | * | 1/1972 | Hamburg | 285/81 |
| 3,733,093 A | * | 5/1973 | Seiler | 285/342 |
| 3,888,522 A | * | 6/1975 | Moreiras | 285/341 |
| 3,970,337 A | * | 7/1976 | Niemeyer | 285/342 |
| 3,972,547 A | * | 8/1976 | Itoya | 285/341 |
| 3,980,325 A | * | 9/1976 | Robertson | 285/249 |
| 4,095,826 A | * | 6/1978 | Borradori | 285/330 |
| 4,257,629 A | * | 3/1981 | Maple et al. | 285/12 |
| 4,647,086 A | * | 3/1987 | Maxwell et al. | 285/342 |
| 4,676,533 A | * | 6/1987 | Gerondale | 285/139.2 |
| 4,777,669 A | * | 10/1988 | Rogus | 4/696 |
| 4,900,068 A | * | 2/1990 | Law | 285/139.2 |
| 4,911,406 A | * | 3/1990 | Attwood | 251/148 |
| 4,944,534 A | * | 7/1990 | Kotyk | 285/4 |
| 5,496,076 A | * | 3/1996 | Lin | 285/110 |
| 5,681,058 A | * | 10/1997 | Hwang | 285/133.4 |

FOREIGN PATENT DOCUMENTS

JP        7-248087        9/1995

* cited by examiner

*Primary Examiner*—Vishal Patel
(74) *Attorney, Agent, or Firm*—Armstrong, Kratz, Quintos, Hanson & Brooks, LLP

(57) ABSTRACT

A pipe joint provided with a joint main body having a male screw portion and a cap nut screwed on the male screw portion of the joint main body. And, the pipe joint has a C-shaped stop ring having an opening on its periphery. The stop ring, having an inner blade to cut a concave groove on a peripheral face of a pipe, is disposed as a peripheral face contacts a tapered inner face of a hole portion of the cap nut. Further, a co-rotation means is provided to rotate the cap nut and the stop ring together.

4 Claims, 4 Drawing Sheets

PIPE JOINT

BACKGROUND OF THE INVENTION

1. Field of the Invention

This invention relates to a pipe joint.

2. Description of the Related Art

A conventional pipe joint, in which a joint main body is provided with a fastening portion to which an end portion of a pipe is fit and a guide portion to contact an inner peripheral face of the end portion of the pipe, and the end portion of the pipe is fixed and connected by screwing a cap nut, a female screw portion is formed on an inner peripheral face, onto a male screw portion formed on the fastening portion of the joint main body, is known (refer to Japanese provisional publication No. 7-248087). And, a sealing member (an O-ring) is disposed in a peripheral groove portion on a peripheral face of the guide portion of the joint main body and touching the inner peripheral face of the end portion of the pipe.

In this conventional pipe joint, the end portion of the pipe is fastened and fixed to the fastening portion of the joint main body by screwing the cap nut to the joint main body.

However, when strong drawing force works on the pipe in an axis direction, the pipe may be slid between the guide portion and the fastening portion of the joint main body and easily drawn out of the pipe joint.

It is therefore an object of the present invention to provide a pipe joint, in spite of its simple construction, with which the pipe is not drawn out and firmly fixed even if the strong drawing force of the axis direction works.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
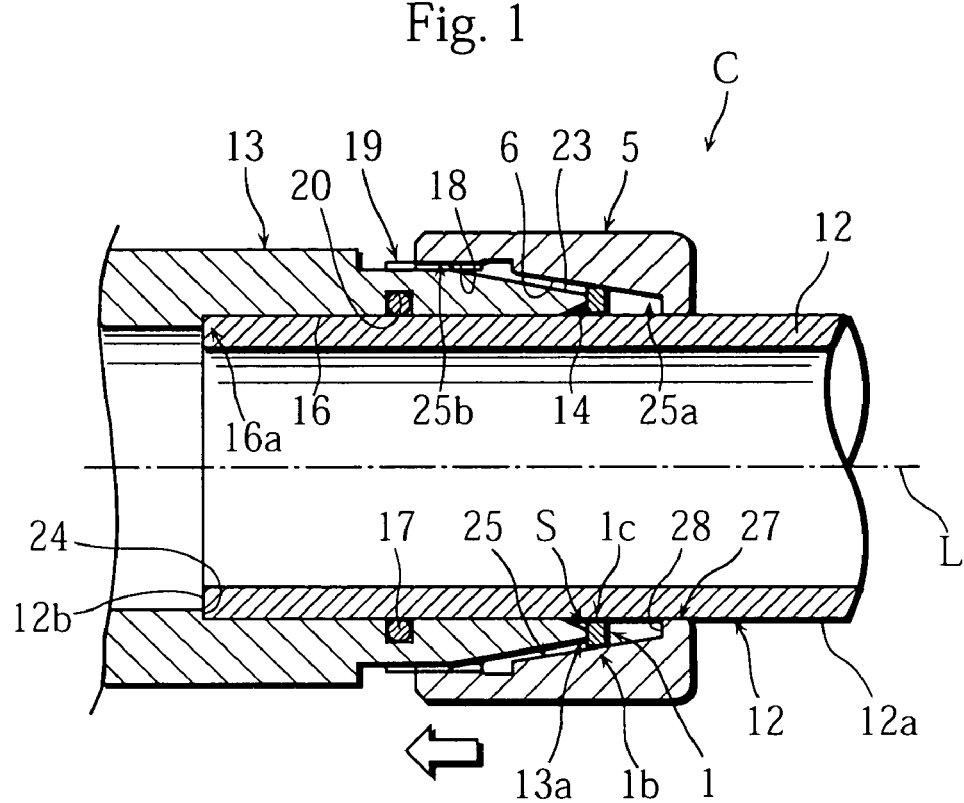
FIG. 1 is a cross-sectional side view of a first embodiment of a pipe joint of the present invention.
Figure 2:
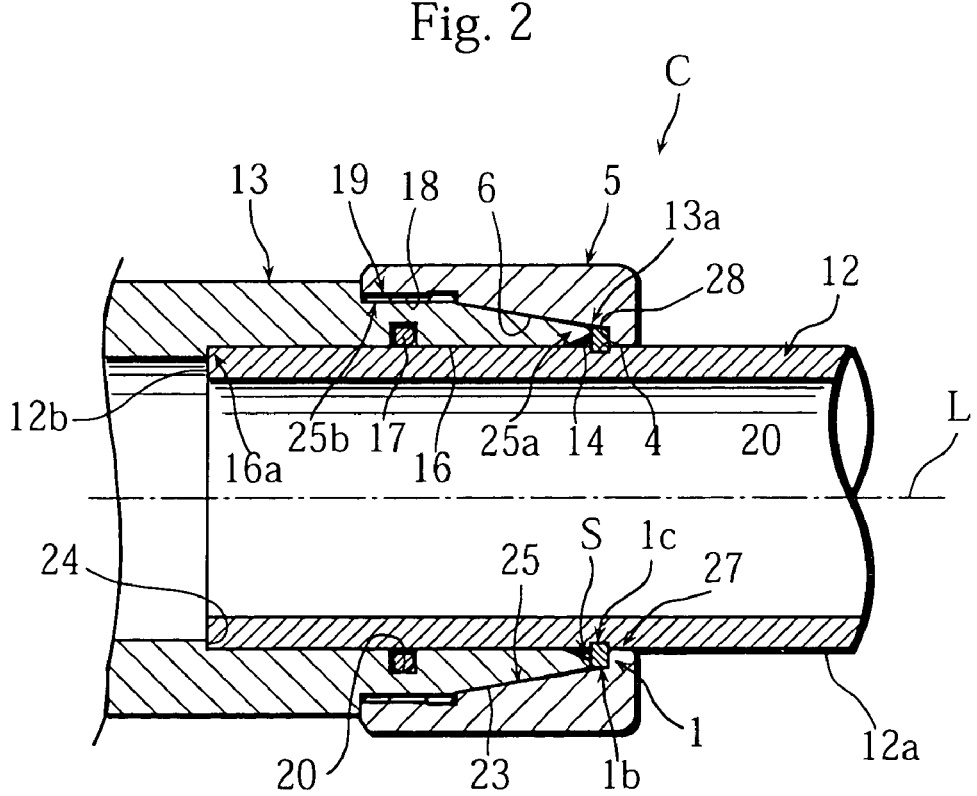
FIG. 2 is a cross-sectional side.
Figure 3A:
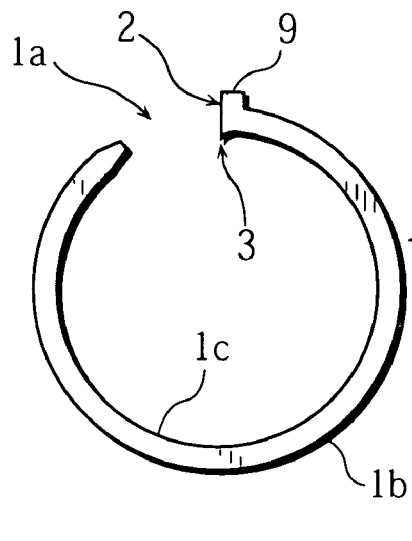
FIG. 3A is a front view showing a stop ring.
Figure 3B:
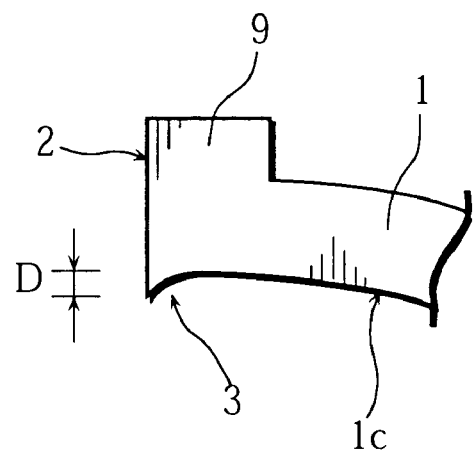
FIG. 3B is an enlarged front view of a principal portion showing the stop ring.
Figure 6:
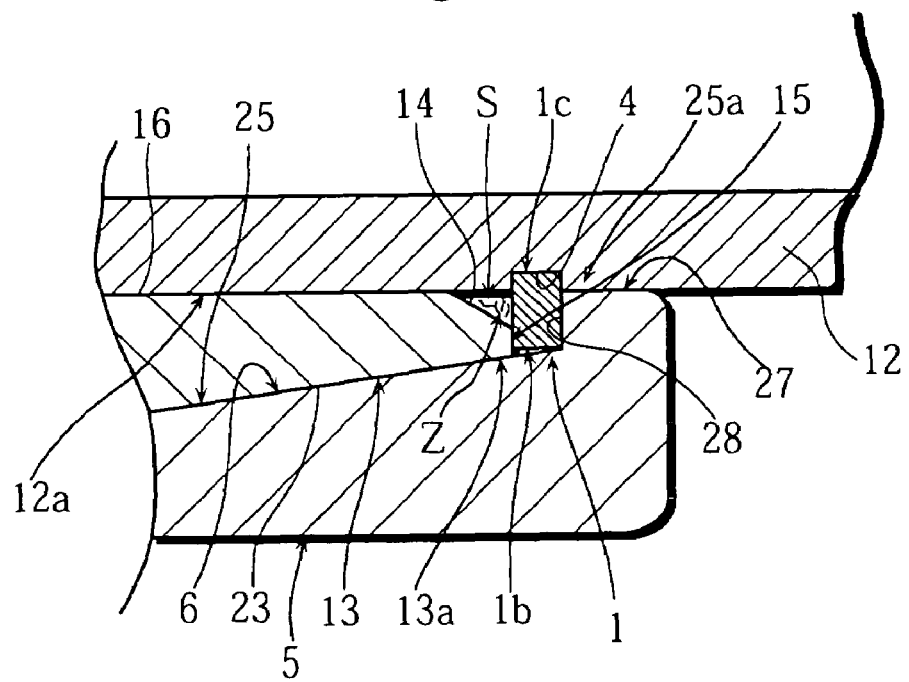
FIG. 6 is an enlarged cross-sectional view of a principal portion.

As shown in FIG. 1, FIG. 2, and FIG. 6, a pipe joint C relating to the present invention is provided with a joint main body 13 having a male screw portion 19 and a cap nut 5 screwed on the male screw portion 19 of the joint main body 13.

Concretely, the cap nut 5 has a hole portion to which a pipe 12 is inserted, and the hole portion 25 is composed of an insertion hole portion 27 formed on a side 25a of the cap nut 5 and the pipe 12 is inserted to, a peripheral staged portion 28 formed on an inner side of the insertion hole portion 27, a tapered inner face 6 formed as to increase in diameter from the peripheral staged portion 28 to an inner side, and a female screw portion 18 formed on another side 25b and screwed on the male screw portion 19.

The joint main body 13 has a hole portion 16 to which the pipe is inserted, a holding ridge portion 20, to hold a sealing member 17 such as an O-ring, is formed on the hole portion 16, and a tapered outer face portion 23, to contact the tapered inner face 6 of the cap nut when the screwing is completed, is formed on a front end side of the joint main body 13.

And, an end portion 13a of the tapered outer face portion 23 has a pressing face portion 15 to press a stop ring 1 when screwed to the cap nut 5 and a peripheral beveled portion 14 formed by beveling an inner peripheral edge of the pressing face portion 15, and a gap portion S, in which chips Z cut out of the pipe 12 by an inner blade 3 are accumulated, is formed by the peripheral beveled portion 14, a side of the stop ring 1, and a peripheral face 12a of the pipe 12 (refer to FIG. 6). The peripheral beveled portion 14, although tapered in Figures, may be formed to be staged (in rectangle) in cross section.

And, although a part of the joint main body 13 is shown (in cross section) in FIG. 1 and FIG. 2, the whole joint main body 13 may be various types such as straight, elbow, tee, socket, etc. Further, another joint of similar construction may be formed on another side out of Figures.

And, a limit staged portion 24, which contacts an end portion 12b of the inserted pipe 12, is formed on a rear end side 16a of the hole portion 16.

Further, in FIGS. 1 through 6, the pipe joint C has the stop ring 1 of C-shape having an opening 1a on its periphery, the stop ring 1 is disposed as a peripheral face 1b contacts the tapered inner face of the hole portion 25 of the cap nut 5, and a co-rotation means 7 is provided to unitedly rotate the cap nut 5 and the stop ring 1.

Concretely, in the stop ring 1, a hitching convex portion 9, hitching to a concave groove 8 of the cap nut 5, is formed on the peripheral face 1b, and the concave groove 8 is formed on the tapered inner face 6 of the cap nut 5 along an axis direction L of the pipe 12. The stop ring 1 is preferably made of a material such as stainless steel.

Figure 7:
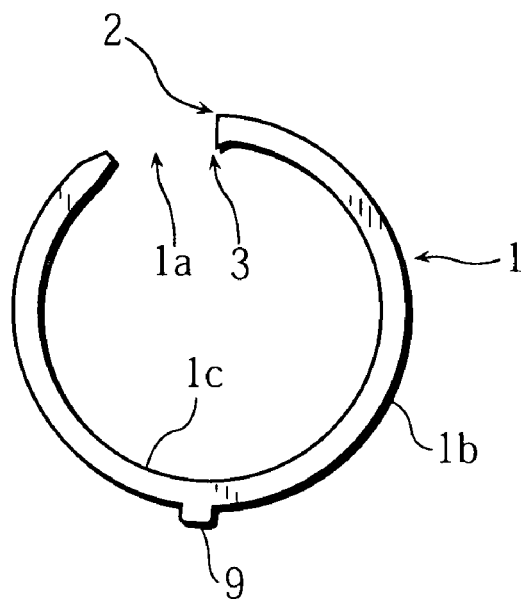
FIG. 7 is a front view showing a stop ring of a second embodiment of the pipe joint of the present invention.

The hitching convex portion 9 may be on an end 2 side of the opening 1a of the stop ring 1 (refer to FIG. 3 and FIG. 5), or on a middle portion of the peripheral face 1b (refer to FIG. 7).

The end 2 means a side on a head of the rotated stop ring 1 when the cap nut 5 is screwed.

And, the co-rotation means 7 is composed of the concave groove 8 of the cap nut 5 and the hitching convex portion 9, and the hitching convex portion 9 is hitched to the concave groove 8 as to freely slide in the axis direction L.

Figure 8:
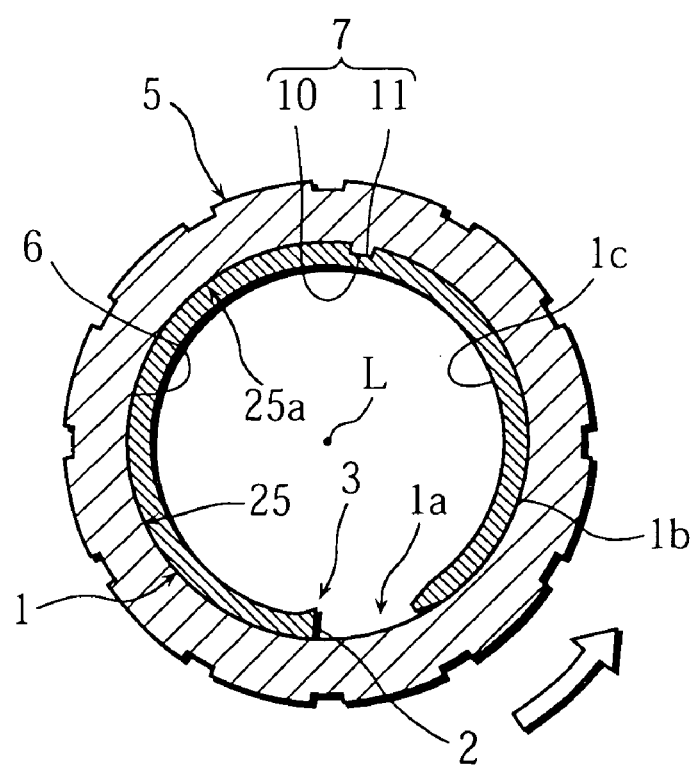
FIG. 8 is a front view of an end face showing a third embodiment of the pipe joint of the present invention.

FIG. 8 shows a third embodiment of the pipe joint relating to the present invention. In this pipe joint, a convex ridge portion 10 is formed on the tapered inner face 6 of the cap nut 5 along the axis direction L of the pipe 12, and a concave groove portion 11, to which the convex ridge portion 10 is hitched, is formed on the peripheral face 1b of the stop ring 1.

And, the co-rotation means 7 is composed of the convex ridge portion 10 of the cap nut 5 and the concave groove portion 11 of the stop ring 1, and the convex ridge portion 10 is hitched to the concave groove portion 11 as to freely slide in the axis direction L.

The concave groove portion 11, although formed on a middle portion of the peripheral face 1b of the stop ring 1 in FIG. 8, may be formed near the end 2 of the peripheral face 1b.

And, as shown in FIGS. 3A, 3B, 7, and 8, the stop ring 1 has the inner blade 3, to cut a concave groove 4 on the peripheral face 12a of the pipe 12, on the end 2 of the opening 1a. The inner blade 3 is formed as a blade of a predetermined protruding dimension D protruding from an inner peripheral face 1c of the stop ring 1 inward in diameter direction. The predetermined protruding dimension D, set to be 0.3 mm to 0.7 mm corresponding to the thickness dimension of the pipe 12 to be connected, is preferably about 0.5 mm (refer to FIG. 3B). When the protruding dimension D is less than 0.3 mm, the concave groove 4 cut on the peripheral face 12a of the pipe 12 becomes shallow and stopping effect of the pipe 12 is low, and when the protruding dimension D is more than 0.7 mm, inconvenience is caused because fastening of the cap nut 5 requires strong force and strength of the pipe 12 may be lowered for thin wall thickness.

Next, usage (function) of the above pipe joint is described.

Figure 4:
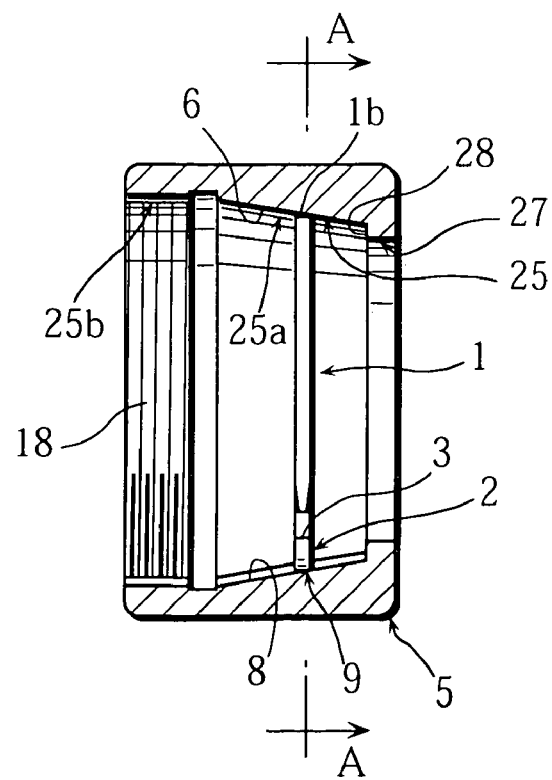
FIG. 4 is a side view with partial cross-section showing a cap nut and the stop ring.
Figure 5:
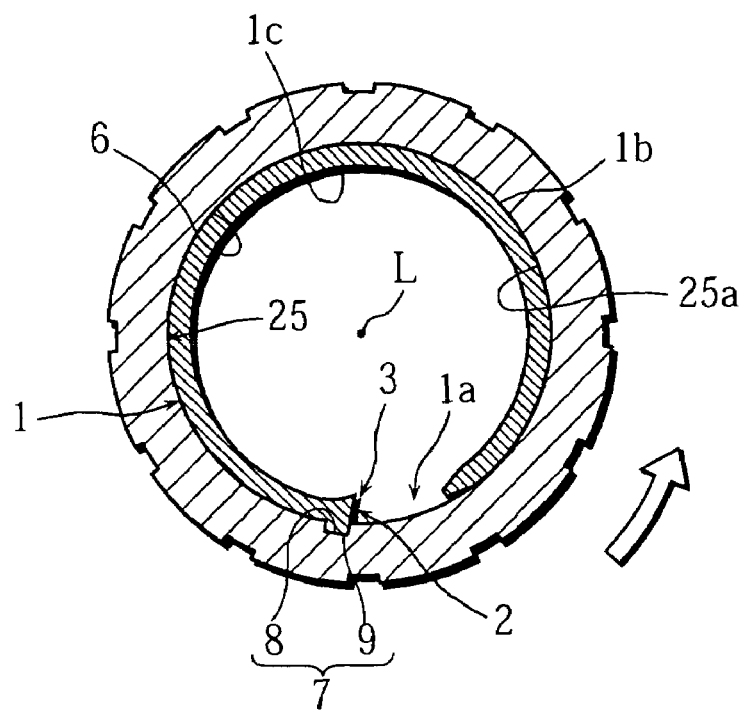
FIG. 5 is a cross-sectional view of A—A line in FIG. 4.

First, the hitching convex portion 9 of the stop ring 1 is hitched to the concave groove portion 8 on the tapered inner face 6 of the cap nut 5, and the stop ring 1 is disposed as the peripheral face 1b contacts the tapered inner face 6 of the cap nut 5 as in FIG. 4 and FIG. 5.

Or, in the pipe joint in FIG. 8, the convex ridge portion 10 of the cap nut 5 is hitched to the concave groove portion 11 of the stop ring 1, and the stop ring 1 is disposed as the peripheral face 1b contacts the tapered inner face 6 of the cap nut 5.

Then, the pipe 12 is inserted to the insertion hole portion 27 of the cap nut 5, going through the inner peripheral face 1c of the stop ring 1, and inserted to the hole portion 16 of the joint main body 13 until the end portion 12b of the pipe 12 contacts a limit staged portion 24 of the hole portion 16 of the joint main body 13 to make the state in FIG. 1.

And, in the state of FIG. 1, the pressing face portion 15 of the end portion 13a of the joint main body 13 presses the stop ring 1 to the end side 25a of the hole portion 25 of the cap nut 5 as the cap nut 5 is screwed on the joint main body 13. In this process, the stop ring 1 unitedly rotates with the cap nut 5, slides on the tapered inner face 6 in the axis direction L, and gradually decreases in diameter. In this state, the pipe 12 does not rotate with respect to the joint main body 13, and the inner blade 3 of the stop ring 1 spirally cuts the concave groove 4 on the peripheral face 12a of the pipe 12.

And, as shown in FIG. 2 and FIG. 6, the screwing is completed when the stop ring 1 is screwed until the staged portion 28 of the cap nut 5. In this case, the stop ring 1 is held by the staged portion 28 of the cap nut 5 and the pressing face portion 15 of the joint main body 13. The pipe 12 hitched to the stop ring 1 is firmly fixed to the pipe joint thereby.

And, the rotation (screwing) is smoothly conducted because the chips Z cut out of the pipe 12 are accumulated in the above-mentioned gap portion S during the screwing.

The material of the pipe 12, although polypropylene (PP), vinyl chloride, and other resins are preferable, may be soft metal (such as copper and brass) which is easy to cut.

And, the peripheral beveled portion 14 may be omitted and the opening 1a itself may be used as the gap portion S to accumulate the chips Z.

As described above, in a pipe joint provided with the joint main body 13 having the male screw portion 19 and the cap nut 5 screwed on the male screw portion 19 of the joint main body 13, the C-shaped stop ring 1 having the opening 1a on the periphery is provided, the stop ring 1 has the inner blade 3 on the end 2 of the opening 1a to cut the concave groove 4 on the peripheral face 12a of the pipe 12, the stop ring 1 is disposed as the peripheral face 1b of the stop ring 1 contacts the tapered inner face 6 of the hole portion 25 of the cap nut 5, and the co-rotation means 7, to unitedly rotate the cap nut 5 and the stop ring 1, is provided. So the stop ring 1 cuts the peripheral face 12a of the pipe 12 simply by screwing the cap nut 5 to the joint main body 13, the groove 4 formed by the cutting is gradually deepening, and the stop ring 1 is firmly fixed to the peripheral face 12a of the pipe 12 thereby.

Therefore, in spite of the simple construction and small number of parts, the pipe 12 is certainly fixed to the pipe joint and not drawn out even if the strong drawing force works, and it is convenient to conduct connection of various pipings in various working sites without sudden separation after the connection.

The co-rotation means 7 is composed of the concave groove 8 formed on the tapered inner face 6 of the cap nut 5 and along the axis direction L of the pipe 12, and the hitching convex portion 9 formed on the peripheral face 1b of the stop ring 1 and hitched to the concave groove 8 of the cap nut 5. So the stop ring 1, in spite of its easy production, is certainly rotated unitedly with the cap nut 5 in screwing without falling, and certainly hitched to the peripheral face 12a of the pipe 12. Further, the stop ring 1 is easily set to the cap nut 5 without excessive process, and the connection work is conveniently conducted swiftly and smoothly.

The co-rotation means 7 is composed of the convex ridge portion 10 formed on the tapered inner face 6 of the cap nut 5 and along the axis direction L of the pipe 12, and the concave groove portion 11 formed on the peripheral face 1b of the stop ring 1 and hitched to the convex ridge portion 10 of the cap nut 5. So the stop ring 1, in spite of its easy production, is certainly rotated unitedly with the cap nut 5 in screwing without falling, and certainly hitched to the peripheral face 12a of the pipe 12. And, the stop ring 1 is easily set to the cap nut 5 without excessive process, and the connection work is conveniently conducted swiftly and smoothly.

Further, the gap portion S, in which chips Z cut out of the pipe 12 by the inner blade 3 are accumulated, is formed on the end portion 13a of the joint main body 13. So the screwing of the cap nut 5 becomes smooth, and connection work can be swift and efficient.

While preferred embodiments of the present invention have been described in this specification, it is to be understood that the invention is illustrative and not restrictive, because various changes are possible within the spirit and indispensable features.

What is claimed is:

1. A pipe joint provided with a joint main body having a male screw portion and a cap nut screwed on the male screw portion of the joint main body comprising a construction in which a C-shaped stop ring having an opening on the periphery is provided, the stop ring has an inner blade on an end of the opening to cut a concave groove on a peripheral face of a pipe, the stop ring is disposed as a peripheral face of the stop ring contacts a tapered inner face of a hole portion of the cap nut, and a co-rotation means, to unitedly rotate the cap nut and the stop ring, is provided.

2. The pipe joint as set forth in claim 1, wherein the co-rotation means is composed of a concave groove formed on the tapered inner face of the cap nut and along an axis direction of the pipe, and a hitching convex portion formed on the peripheral face of the stop ring and hitched to the concave groove of the cap nut.

3. The pipe joint as set forth in claim 1, wherein the co-rotation means is composed of a convex ridge portion formed on the tapered inner face of the cap nut and along an axis direction of the pipe, and a concave groove portion formed on the peripheral face of the stop ring and hitched to the convex ridge portion of the cap nut.

4. The pipe joint as set forth in claims 1, 2, or 3, wherein a gap portion, in which chips cut out of the pipe by the inner blade are accumulated, is formed on an end portion of the joint main body.

* * * * *